(12) United States Patent
Hu et al.

(10) Patent No.: US 11,756,185 B2
(45) Date of Patent: *Sep. 12, 2023

(54) PRODUCT DEFECT DETECTION

(71) Applicant: International Business Machines Corporation, Armonk, NY (US)

(72) Inventors: Guo Qiang Hu, Shanghai (CN); Jun Chi Yan, Shanghai (CN); Jun Zhu, Shanghai (CN); Jing Chang Huang, Shanghai (CN); Peng Ji, Nanjing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/131,936

(22) Filed: Dec. 23, 2020

(65) Prior Publication Data

US 2021/0110525 A1    Apr. 15, 2021

Related U.S. Application Data

(63) Continuation of application No. 16/248,114, filed on Jan. 15, 2019, now Pat. No. 10,964,015.

(51) Int. Cl.
*G06K 9/00* (2022.01)
*G06T 7/00* (2017.01)
(Continued)

(52) U.S. Cl.
CPC ......... *G06T 7/001* (2013.01); *G01N 21/8851* (2013.01); *G06T 7/37* (2017.01); *G06V 10/764* (2022.01); *G06V 10/774* (2022.01); *G06V 10/82* (2022.01); *G01N 2021/8887* (2013.01); *G06T 2207/20081* (2013.01); *G06T 2207/20084* (2013.01); *G06T 2207/30108* (2013.01)

(58) Field of Classification Search
USPC ........ 382/141, 151, 181, 209, 155, 159, 145
See application file for complete search history.

(56) References Cited

U.S. PATENT DOCUMENTS 6,266,442 B1   7/2001   Laumeyer et al.
8,213,737 B2   7/2012   Steinberg
(Continued)

OTHER PUBLICATIONS

Chen et al., "A Novel Image Alignment Algorithm Based on Rotation-Discriminating Ring-Shifted Projection for Automatic Optical Inspection," 2016, Applied Sciences, vol. 6, 21 pages.
(Continued)

*Primary Examiner* — Marceau Milord
(74) *Attorney, Agent, or Firm* — Amin, Turocy & Watson, LLP

(57) ABSTRACT

Embodiments of the present invention facilitate product defect detection. A computer-implemented method comprises: receiving, by a device operatively coupled to one or more processors, a template image of a normal product; generating, by the device, one or more geometric training parameters for transforming the template image; and transforming, by the device, the template image using the one or more geometric training parameters to generate a transformed image for training a data model, wherein the trained data model being used for aligning the template image and an image under inspection of a product.

20 Claims, 8 Drawing Sheets

(51) Int. Cl.
*G06T 7/37* (2017.01)
*G01N 21/88* (2006.01)
*G06V 10/764* (2022.01)
*G06V 10/774* (2022.01)
*G06V 10/82* (2022.01)

(56) References Cited

U.S. PATENT DOCUMENTS

| | | | |
|---|---|---|---|
| 8,330,831 B2 | 12/2012 | Steinberg | |
| 8,593,542 B2 | 11/2013 | Steinberg | |
| 8,682,097 B2 | 3/2014 | Steinberg | |
| 8,965,134 B2 | 2/2015 | Kompalli | |
| 8,977,035 B2 | 3/2015 | Dalla-Torre et al. | |
| 8,995,715 B2 | 3/2015 | Sultana | |
| 9,098,891 B2 | 8/2015 | Kulkarni et al. | |
| 9,349,076 B1 | 5/2016 | Liu et al. | |
| 9,477,886 B2 | 10/2016 | Ghessassi | |
| 9,934,951 B2 | 4/2018 | Krassnitzer | |
| 10,482,604 B2 | 11/2019 | Guo et al. | |
| 10,599,951 B2 | 3/2020 | Bhaskar et al. | |
| 10,748,029 B2* | 8/2020 | Jaderberg | G06V 10/454 |
| 10,964,015 B2* | 3/2021 | Hu | G06V 10/82 |
| 11,521,040 B2* | 12/2022 | Saito | G06K 9/6262 |
| 2008/0316327 A1 | 12/2008 | Steinberg | |
| 2008/0316328 A1 | 12/2008 | Steinberg | |
| 2008/0317357 A1 | 12/2008 | Steinberg | |
| 2009/0324107 A1 | 12/2009 | Walch | |
| 2011/0243477 A1* | 10/2011 | Minerich | G06V 10/243 382/294 |
| 2014/0105482 A1* | 4/2014 | Wu | G06T 7/001 382/149 |
| 2014/0281910 A1 | 9/2014 | Ghessassi | |
| 2015/0109418 A1 | 4/2015 | Lin | |
| 2016/0012595 A1* | 1/2016 | Romanik | G06V 10/757 382/203 |
| 2016/0071256 A1 | 3/2016 | Wu et al. | |
| 2016/0210525 A1 | 7/2016 | Yang | |
| 2018/0165554 A1* | 6/2018 | Zhang | G06K 9/6256 |
| 2018/0330185 A1* | 11/2018 | Jaderberg | G06N 3/084 |
| 2018/0357756 A1* | 12/2018 | Kawka | G06N 3/08 |
| 2019/0080444 A1 | 3/2019 | Hu | |
| 2019/0213724 A1* | 7/2019 | Avrahami | G06F 30/00 |
| 2019/0236767 A1 | 8/2019 | Hu | |
| 2019/0303717 A1* | 10/2019 | Bhaskar | G06T 7/0004 |
| 2020/0098101 A1* | 3/2020 | Pandey | G06N 3/0472 |
| 2021/0004984 A1* | 1/2021 | Ji | G06T 7/73 |
| 2022/0066456 A1* | 3/2022 | Ebrahimi Afrouzi | A47L 11/4013 |
| 2022/0121884 A1* | 4/2022 | Zadeh | G06N 3/006 |

OTHER PUBLICATIONS

Ren et al., "Faster R-CNN: Towards Real-Time Object Detection with Region Proposal Networks", IEEE Transactions on Pattern Analysis and Machine Intelligence, 2016, vol. 39, No. 6, 9 pages.

Felzenszwalb et al., "Object Detection with Discriminatively Trained Pad Based Models," IEEE Trans. PAMI, 2010, pp. 1627-1645, vol. 32, No. 9, 20 pages.

Liu et al., "SSD: Single Shot MultiBox Detector", ECCV 2016, arXiv:1512.02325v5 [cs.CV], 17 pages.

Sun et al., "Further development of adaptable automated visual inspection—part I: concept and scheme", The International Journal of Advanced Manufacturing Technology, 2015, pp. 1067-1076, vol. 81, Springer, 10 pages.

"OpenCV: Feature Matching + Homography to find Objects," 2 pages. Retrieved on Jan. 11, 2019. https://docs.opencv.org/3.2.0/d1/de0/tutorial_py_feature_homography.html.

Hashemi et al., "Template Matching Advances and Applications in Image Analysis," 2016, arXiv: 1610.07231v1 [cs.CV], 9 pages.

Zamir et al., "Image Geo-Localization Based on Multiple Nearest Neighbor Feature Matching Using Generalized Graphs," IEEE Transactions on Pattern Analysis and Machine Intelligence, Aug. 2014, pp. 1546-1558, vol. 36, No. 8, IEEE, 13 pages.

Office Action for U.S. Appl. No. 16/248,114 dated Jul. 9, 2020, 50 pages.

* cited by examiner

PRODUCT DEFECT DETECTION

BACKGROUND

One or more embodiments relates to detection of product defects, and more specifically, to detection of product defects by aligning product images under inspection with template product images.

SUMMARY

With fast growth of manufacturing of micro-size products, there is growing demand on visual detection automation and intelligence technologies across industry domains to identify defects in a product. For example, when a smartphone part, a published circuit board (PCB) product, a liquid crystal display (LCD) panel, or a storage device is manufactured, an image of the product may be captured, and a defect detection is performed on the captured image.

According to one embodiment of the present disclosure, there is provided a computer-implemented method facilitating product defect detection. A computer-implemented method comprises: receiving, by a device operatively coupled to one or more processors, a template image of a normal product; generating, by the device, one or more geometric training parameters for transforming the template image; and transforming, by the device, the template image using the one or more geometric training parameters to generate a transformed image for training a data model, wherein the trained data model being used for aligning the template image and an image under inspection of a product.

According to another embodiment of the present disclosure, there is provided a system facilitating product defect detection. The system comprises: a memory that stores computer executable components; and a processor that executes the computer executable components stored in the memory. The computer executable components comprise at least one computer-executable component that: receives a template image of a normal product; generates one or more geometric training parameters for transforming the template image; and transforms the template image using the one or more geometric training parameters to generate a transformed image for training a data model, wherein the trained data model being used for aligning the template image and an image under inspection of a product.

According to yet another embodiment of the present disclosure, there is provided a computer program product facilitating detection of product defects by aligning product images under inspection with template product images. The computer program product comprises a computer readable storage medium having program instructions embodied therewith, the program instructions executable by one or more processors to cause the one or more processors to: receive, by the one or more processors, a template image of a normal product; generate, by the one or more processors, one or more geometric training parameters for transforming the template image; and transform, by the ne or more processors, the template image using the one or more geometric training parameters to generate a transformed image for training a data model, wherein the trained data model being used for aligning the template image and an image under inspection of a product.

BRIEF DESCRIPTION OF THE DRAWINGS

Through the more detailed description of some embodiments of the present disclosure in the accompanying drawings, the above and other objects, features and advantages of the present disclosure can become more apparent, wherein the same reference generally refers to the same components in the embodiments of the present disclosure.

DETAILED DESCRIPTION

Some embodiments can be described in more detail with reference to the accompanying drawings, in which the embodiments of the present invention have been illustrated. However, the one or more embodiments can be implemented in various manners, and thus should not be construed to be limited to the embodiments disclosed herein.

Figure 1:
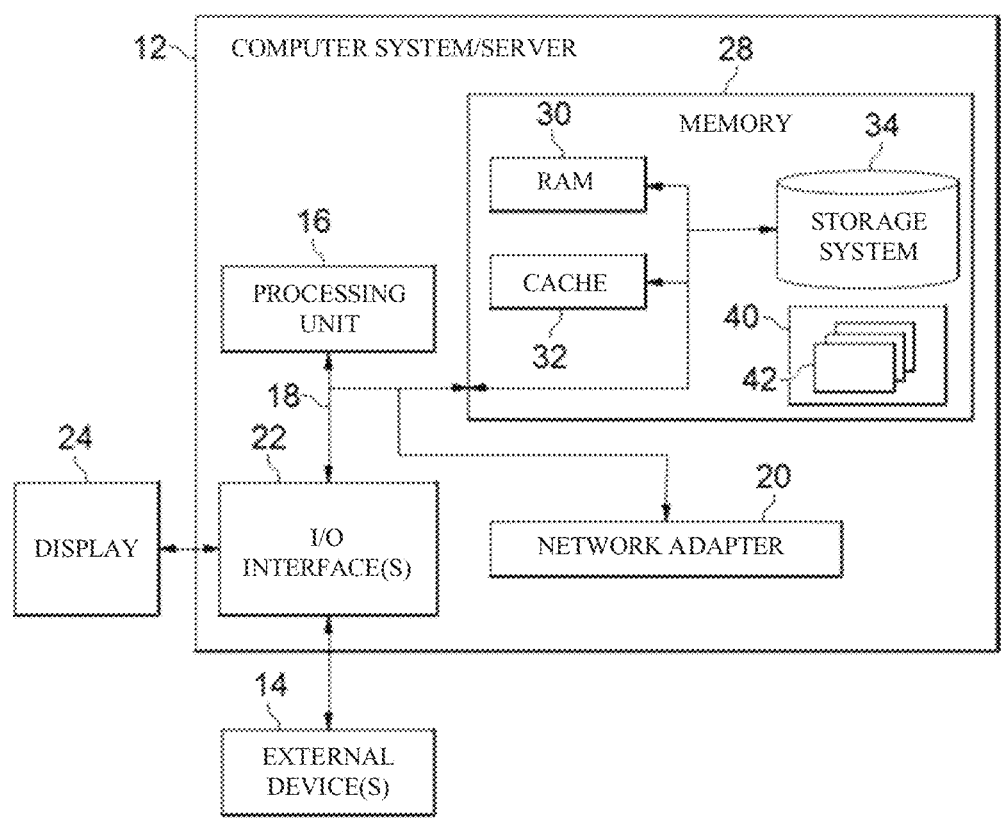
FIG. 1 shows an example computer system which is applicable to implement one or more embodiments described herein.

Referring now to FIG. 1, in which an exemplary computer system/server 12 which is applicable to implement the embodiments of the present disclosure is shown. FIG. 1 is also adapted to depict an illustrative example of a computer processor which is applicable to implement the embodiments of the present disclosure. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As can be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

According to current auto visual inspection technology applied on the manufacturing line or assembly line, a camera (or other photographing device) is deployed to capture an image of a manufactured product. Then the captured image of the manufactured product can be compared to a template image of a standard product without any defect to identify if there is any defect on the manufactured product under inspection, and if so, which of the region of interest (ROIs) is the defect located in. One problem of auto visual inspection solutions is that the location of a product object (e.g. PCB) in an image captured by the camera is not fixed due to the inherent variability in photographing. For example, the manufactured product on the assembly line can rotate a little bit for certain reasons, or the captured image of the product may scale or shear a little bit out of expectation. This kind of rotation, shearing and/or scaling can result in need to align the captured image with the template image so that the two images can be compared to identify the defects.

Figure 2A:
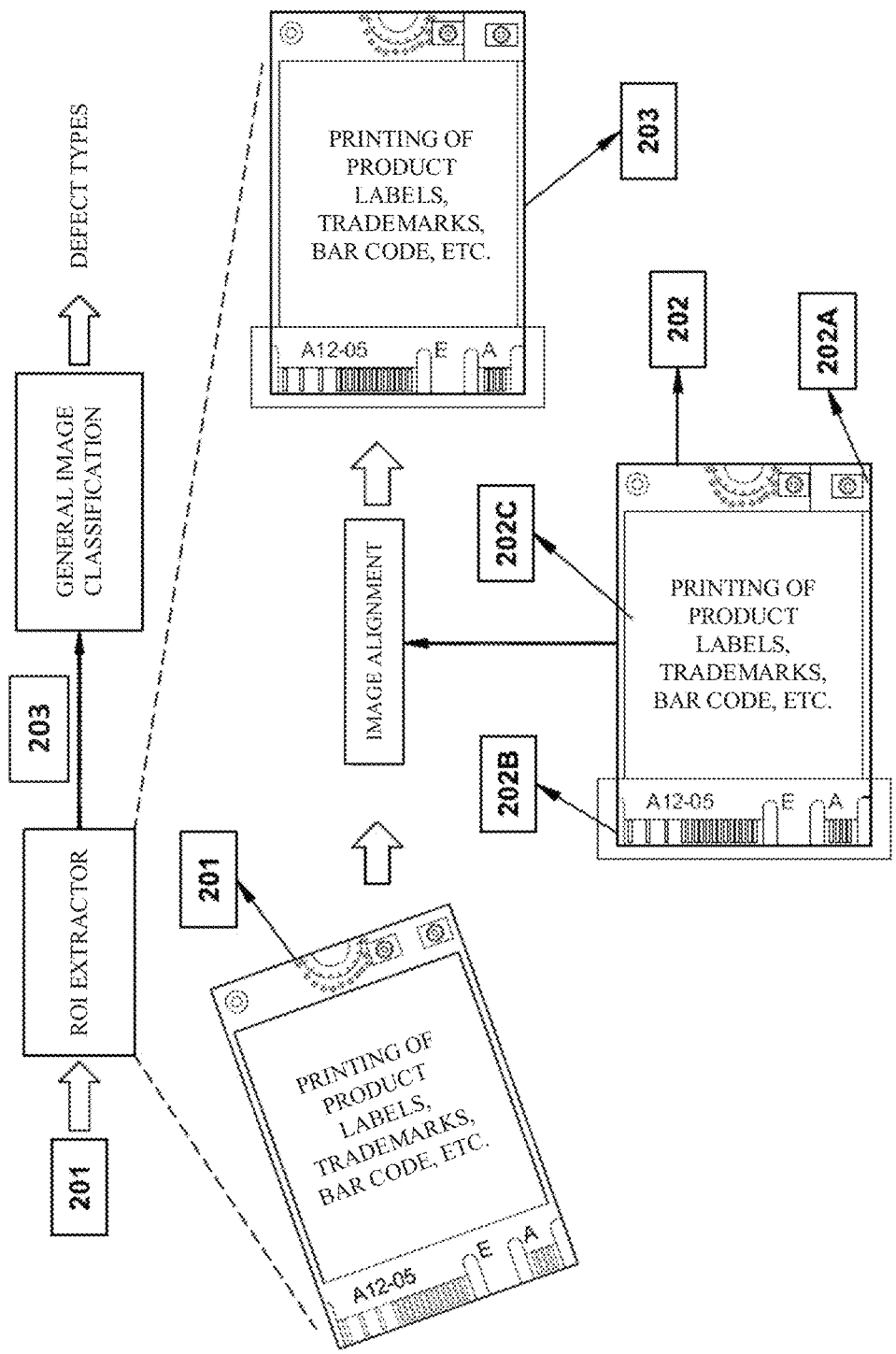
FIG. 2A briefly shows basic work flow of one or more embodiments with a product image.

With reference now to FIG. 2A, the basic work flow of one or more embodiments with an exemplary product image is shown. In FIG. 2A, 201 refers to an actual product image under inspection. As an example, 201 in FIG. 2A is shown as a piece of chip. Such product image 201 under inspection can be captured by a camera or any other types of image capturing devices. Then, the product image 201 under inspection can be fed into a ROI (Region of Interest) Extractor, in which the ROI of the product image 201 can be extracted. As shown in FIG. 2A, 202A, 202B and 202C are three ROIs defined in the template image 202. Wherein 202A is an antenna area of the product, 202B is a golden finger area of the product and 202C is a label printing area of the product. Then the output of ROI Extractor, e.g., a product image with regions of interests being extracted and marked, can be fed into a General Image Classification module. In the General Image Classification module, the extracted ROIs can be compared to ROIs defined in the template image of the product to determine if there is any defect and the defect type. This is a general and standard work flow for product defect detection. However, as for the ROI Extractor, there can be a typical problem that sometimes the captured product image 201 under inspection cannot be directly aligned with the template product image. For example, in FIG. 2A, the captured product image 201 is rotated for a certain angle. The rotation can be caused by slight shaking of the camera device, or swaying of the production line, or whatever other reasons. It is to be understood that rotation is not the sole reason to cause the displacement of the product image 201 under inspection. Other reasons can include, but not limited to, shifting, scaling and/or sheering.

There are mainly two existing solutions to align the displaced product image 201 with the template image. One existing solution is called template matching. According to this solution, the template image 202 can be transformed (e.g., rotate, shift, scale) bit by bit to perform correlation between the transformed template image 202 and the captured product image 201 under inspection until the maximum correlation is obtained. This solution is very time-consuming, which is at the time scale of tens of seconds.

Another existing solution is called key points matching. According to this solution, key points of product are defined, and extraction of these key points is performed for both template image 202 and the captured product image 201 under inspection. Then, transformation parameter between the two images can be generated based on the optimization matching between the two sets of key points of the two images for alignment of the two images. This solution is also very time consuming, which is at the time scale of 1-2 seconds. Since there are quite a lot of products for inspection in the production line, such 1-2 seconds time scale for each product image is unacceptable in practice.

Figure 2B:
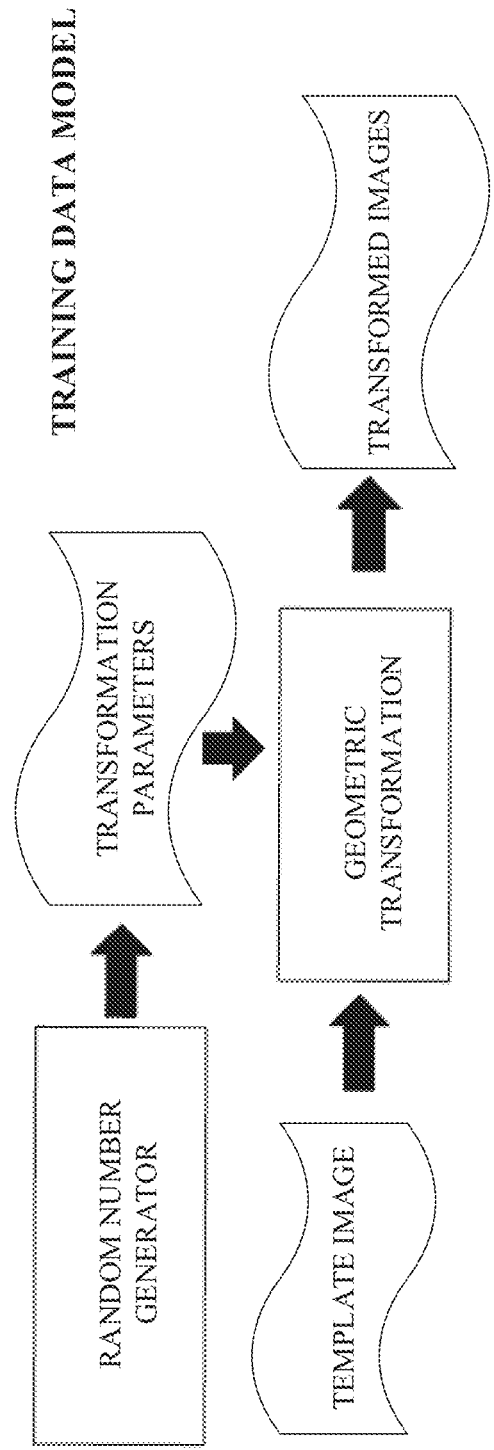
FIG. 2B shows based on the basic work flow of FIG. 2A, the work flow of one or more embodiments in data model training phase.

One or more embodiments described herein provides a new solution to align the captured product image 201 with the template image 202. It can be understood that the solution proposed for the alignment of two images can be implemented in the ROI Extractor module as shown in FIG. 2A. The basic idea of the one or more embodiments can be generally introduced with reference to FIG. 2B and FIG. 2C. There are two phases of the one or more embodiments of the invention shown in FIG. 2B and FIG. 2C, respectively. FIG. 2B shows a basic work flow in data model training phase, and FIG. 2C shows a basic work flow in runtime product defect detection phase using the trained data model according to FIG. 2B.

According to FIG. 2B, a Random Number Generator generates random transformation parameters and these parameters can be provided to a Geometric Transformation module. Another input for the Geometric Transformation module is the template image of a product. Then, the Geometric Transformation module performs transformation on the template image using the generated transformation parameters to generate transformed images. By repeatedly performing this process, many transformed images can be generated using various of transformation parameters that are randomly generated. And, the relationship between the transformation parameters and transformed images can be obtained as well. Through such a self-learning process, the data model can be obtained for future usage to make alignment between actual product image under inspection and the template image.

Figure 2C:
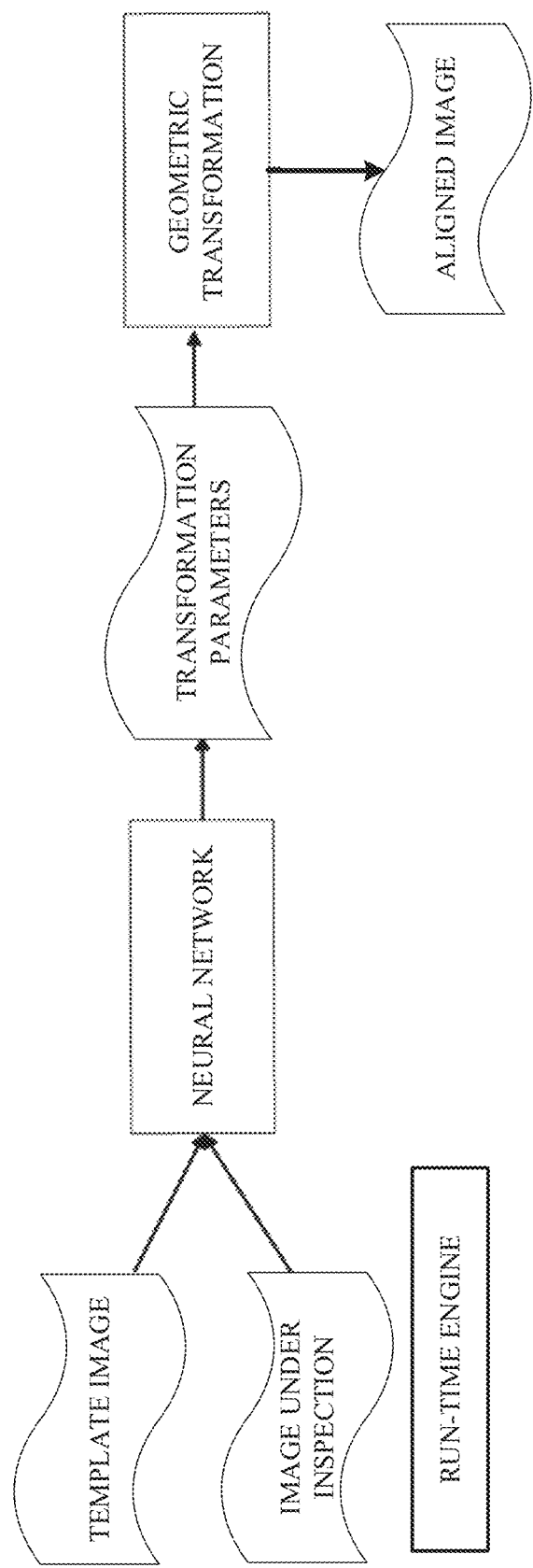
FIG. 2C shows based on the basic work flow of FIG. 2A, the work flow of one or more embodiments at the phase of runtime product defect detection using the trained data model according to FIG. 2B.

According to FIG. 2C, a typical neural network, such as a Convolutional Neural Network (CNN), a Recurrent Neural Network (RNN) or others, can be leveraged for aligning product image under inspection and the template image. There can be two inputs to neural network, namely the template image (such as 202 in FIG. 2A) and the product image under inspection (such as 201 in FIG. 2A). Since the neural network in FIG. 2C has been trained in accordance with the process of data model training shown in FIG. 2B, the neural network can generate actual transformation parameters based on the product image under inspection using the trained data model. Then the Geometric Transformation module can transform the image under inspection using the actual transformation parameters in order to align the image under inspection with the template image.

It can be seen from the above description that during the data training phase, it is easy and fast to generate training data through the Random Number Generator, and during runtime detection phase, there can be low processing time with deterministic processing steps via neural networks in artificial intelligence field.

Figure 3:
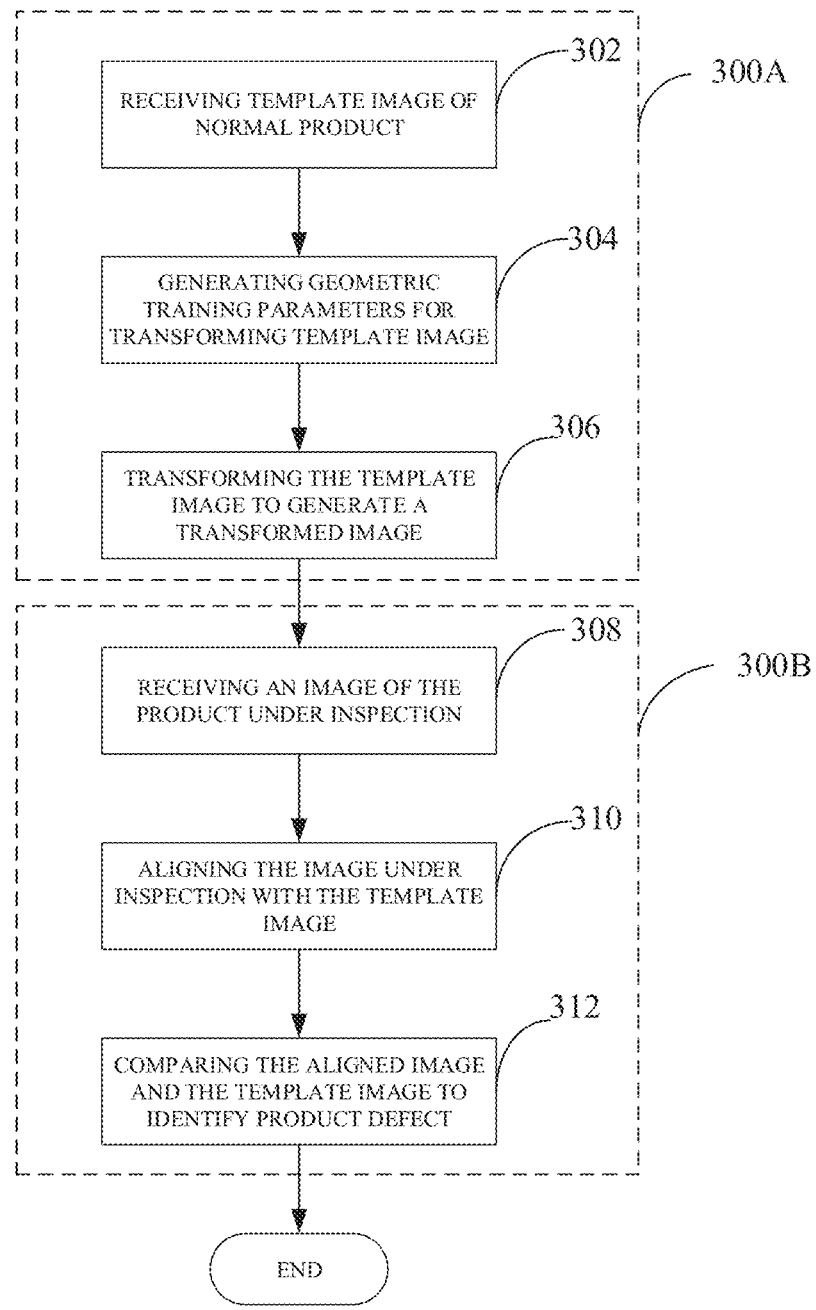
FIG. 3 is a flow chart that shows a computer-implemented method facilitating product defect detection according to an embodiment of the present invention.

FIG. 3 is a flow chart that shows a computer-implemented method facilitating product defect detection according to an embodiment of the present invention. The computer-implemented method shown in FIG. 3 is divided into 300A and 300B corresponding to data training phase and runtime detection phase, respectively. The computer-implemented method starts at step 302 in data training phase 300A. In step 302, a template image of a normal product is received. Here "normal product" means a qualified product. Such template image, like the image 202 in FIG. 2A, can be prepared in many ways beforehand.

Then, the computer-implemented method shown in FIG. 3 moves to step 304, which is still within the data training phase 300A. In step 304, one or more geometric training parameters for transforming the template image can be generated. Geometric training parameters can include, but are not limited to, the angle and direction of rotation, scaling, and shearing and so on. Depending on the type of transformation that is needed, such as affine transformation or perspective transformation, different numbers and types of parameters can be used. Persons skilled in the art can understand that for different types of products and/or the characteristics of the production line, different transformation parameters are needed.

As for the generation of random parameters in step 304, there are several existing mature solutions. For example, there is an existing technology called inverse transform sampling that takes uniform samples of a number u between 0 and 1, interpreted as a probability, and then returns the largest number x from the domain of the distribution P(X) such that $P(X<x)<=u$.

There is also another existing technology for random number generation called linear congruential generator that uses a recurrent formula to generate a sequence of random numbers $x(1)$, $x(2)$, $x(n)$, . . . , $x(n+1)$. Exemplary formula can be:

$$X_{n+1}=(aX_n+b)\mod m.$$

wherein m represents the upper limit of the random number to be generated, for example, if the upper limit of the random number is set to be 100, then the value of m should be 100; "a" and "b" are both constant integral parameters of the formula that can be configured beforehand.

Persons skilled in the art should understand that above mentioned solutions for random number generation are only for the purpose of exemplary. There can be other types of algorithms or solutions that can be leveraged under the present disclosure to perform step 304 to generate transformation parameters during data training phase.

Then the computer-implemented method shown in FIG. 3 moves to step 306. In step 306, the template image is transformed using the one or more geometric training parameters to generate a transformed image for training a data model. Since random transformation parameters have been generated in step 304, they can be used to transform the template image to get transformed image. Repeating the process of generating transformation parameters and transforming the template image with different parameters will get different transformed images corresponding to different parameters. Such huge number of transformed images can be used to train the data model in neural networks such as CNN, RNN and/or Deep Neural Network (DNN).

Figure 4A:
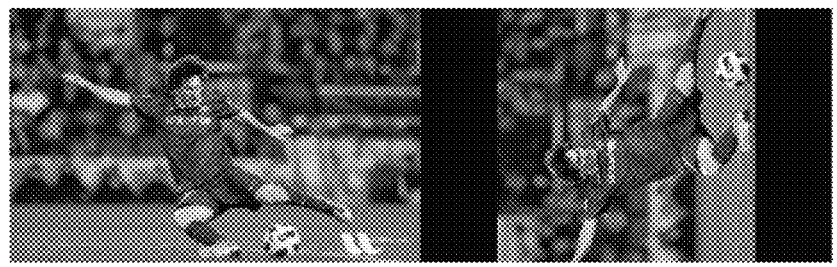
FIG. 4A shows an example rotation transformation of an image according to one or more embodiments disclosed herein.
Figure 4B:
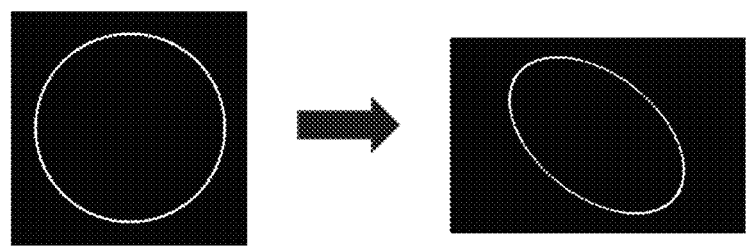
FIG. 4B shows an example shearing transformation of an image according to one or more embodiments disclosed herein.

As for the specific transformation method using certain parameters, this is existing solution that can be implemented by persons skilled in the art. Only for exemplary purpose, FIG. 4A and FIG. 4B shows the image transformation under rotation and shearing parameters respectively. As shown in FIG. 4A, two images are shown in the upper side with rotation for 90 degrees. And, the matrix shown in the lower side of FIG. 4A is the corresponding geometric parameters for such transformation of rotation. As shown in FIG. 4B, also two images are shown in the upper side with shearing transformation. And, the matrix shown in the lower side of FIG. 4B is the corresponding geometric parameters for such transformation of shearing. Persons skilled in the art can understand that for other types of transformation parameters, specific representation of the transformation parameters can be adopted.

Figure 5A:
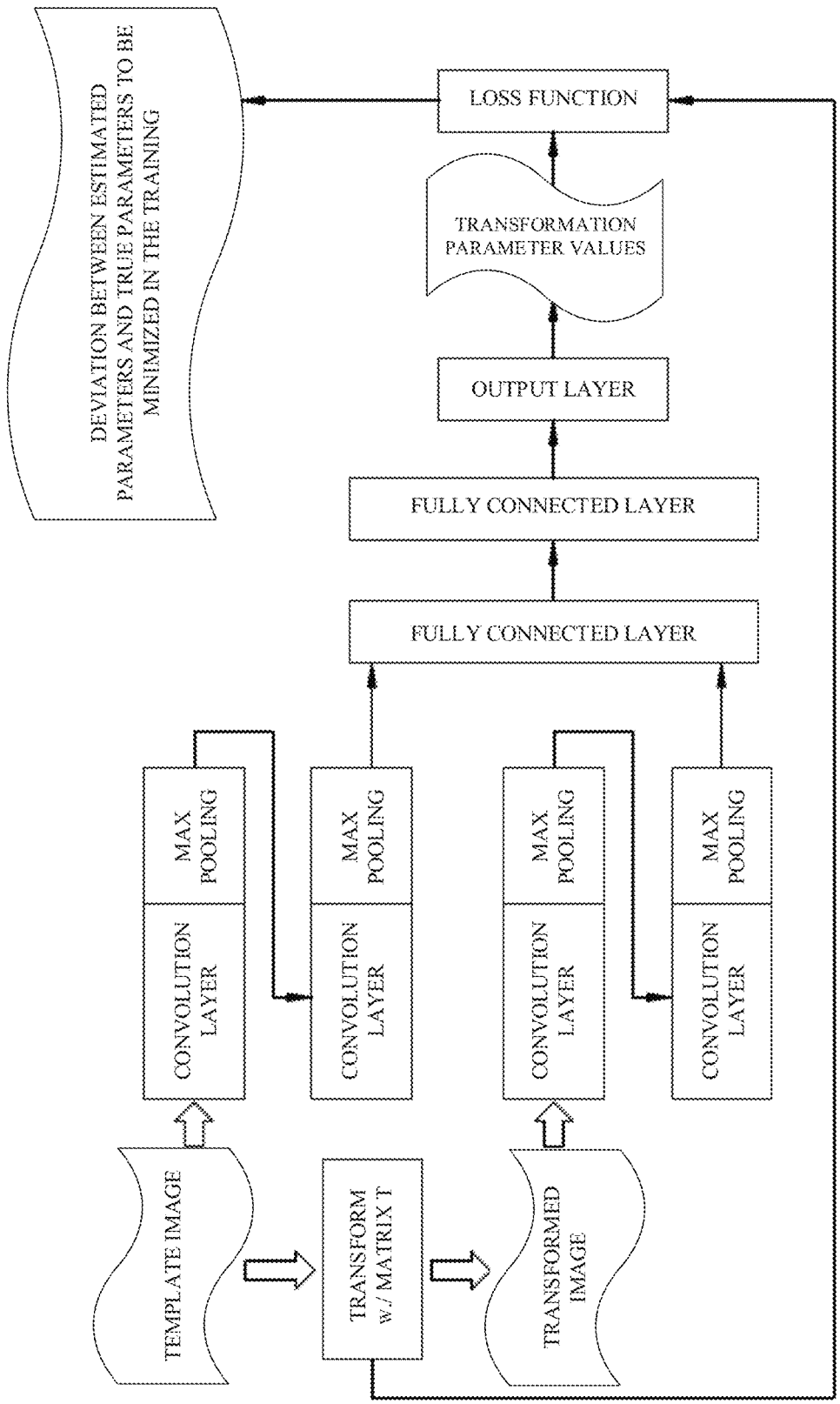
FIG. 5A shows an example neural network architecture for training data model according to an embodiment disclosed herein.

Regarding the architecture of neural network for data training, it is also an existing solution known by persons skilled in the art. FIG. 5A provides an exemplary architecture of neural network for data training purpose under the present disclosure. As shown in FIG. 5A, there is no actual product image under inspection. Template image can be transformed using the Matrix T (refers to the random geometric parameters generated during data training phase) to generate transformed images. And both of the template image and transformed images can be input into neural network containing multiple layers wherein each layer contains convolution layer and max pooling. It should be emphasized that a module of Loss Function can be added to determine the deviation between the estimated transform parameters and the true parameters that is to be minimized in the training phase. The estimated transform parameters are generated based on the transformed image and the template image to test whether the estimated transform parameters are the same as the true parameters that are generated through the random parameter generator. Persons skilled in the art should understand that the architecture shown in FIG. 5A is only for exemplary purpose. More or less layers in the neural network can be deployed depending on the needs in practice.

The key of data training phase is that the data model is trained by self-machine learning of the correspondence between the transformed images and the template image through one or more geometric training parameters that are randomly and automatically generated during data training phase. Only the template image is needed as an input during data training phase, and then huge number of geometric parameters can be randomly generated and used to transform the template image to get huge number of transformed images for learning.

Now let's go back to the method shown in FIG. 3. The method shown in FIG. 3 moves to step 308. Beginning with step 308, the method moves to the phase of runtime detection phase. In step 308, an image of the product under inspection can be received. Such image of the product under inspection can be obtained through cameras or other devices deployed around the production line.

Then, in step 310, the received image under inspection is aligned with the template image. According to an embodiment of the present disclosure, during the aligning process, one or more transformation parameters of the image under inspection with reference to the template image can be determined using the data model trained in data training phase 300A in FIG. 3. Once the transformation parameters are determined, the image under inspection can be transformed using the determined one or more transformation parameters so that the image under inspection can be aligned with the template image. Similar to the data training phase, the runtime alignment is also implemented through neural network according to an embodiment of the present disclosure as shown in FIG. 5B, which shows an example neural network architecture for product defect detection using the data model trained under FIG. 5A according to an embodiment of the present disclosure.

Figure 5B:
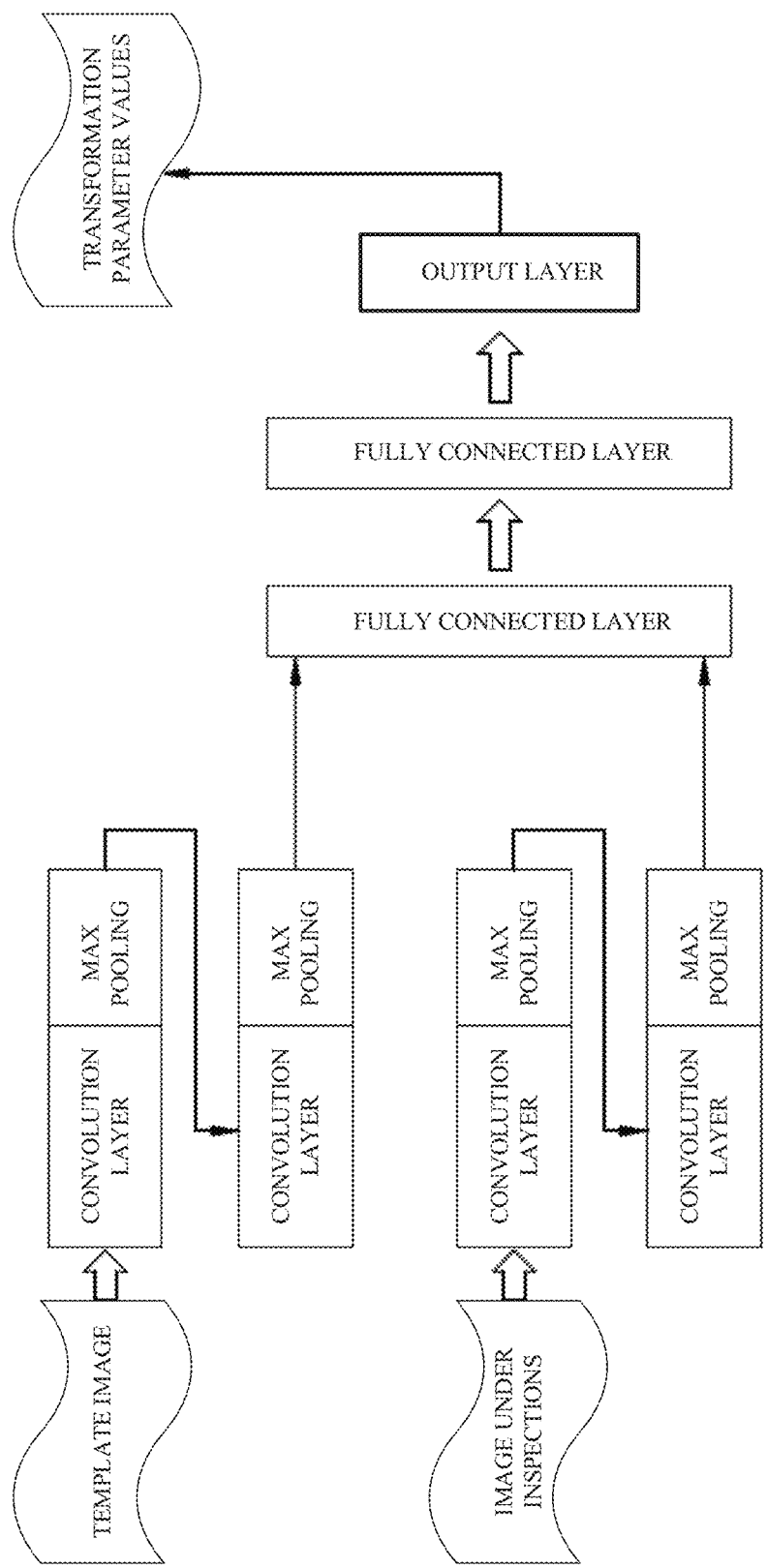
FIG. 5B shows an example neural nestwork architecture for product defect detection using the data model trained under FIG. 5A according to one or more embodiments disclosed herein.

As shown in FIG. 5B, there are two inputs for the neural network for runtime product defect detection, namely the template image and the image under inspections. The output of the neural network for runtime product defect detection is the actual transformation parameter values, based on which the image under inspection can be transformed in order to be aligned with the template image. Persons skilled in the art should understand that the architecture shown in FIG. 5B is also only for exemplary purpose. More or less layers in the neural network can be deployed depending on the needs in practice.

Then the computer-implemented method shown in FIG. 3 moves to step 312. In step 312, the aligned image and the template image can be compared in order to identify any defect of the product. Since the image under inspection has been aligned with the template image in step 310, the aligned two images can be compared using currently existing technology to identify the defect from the product image. The specific way to do the comparison of the two images should be known by persons skilled in the art and will not be introduced in detail here.

It can be seen from above that according to the one or more embodiments herein, a fast neural-network based engine can be provided to derive the transformation parameters of an product image under inspection with reference to a template image. And the processing time is at the scale of several milli-seconds. The training data is generated via geometric transformation with random transformation parameters, which can speed up the data training process in way of self-machine learning, without creating and feeding training parameters manually. The whole process can significantly speed up the alignment of images under inspection and the template image, which will thus speed up the product defect detection process.

It should be noted that the processing of product defect detection according to embodiments described herein can be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    iteratively employing, by a device operatively coupled to a processor, a random number generator to randomly generate respective random transformation parameters to be employed by a geometric transformation module to geometrically transform a template image of a defined product; and
    iteratively generating, by the device, respective geometric training parameters for transforming the template image, wherein the respective geometric training parameters are based on the respective random transformation parameters.

2. The computer-implemented method of claim 1, further comprising:
    iteratively transforming, by the device, the template image using the respective geometric training parameters to generate respective transformed template images that are randomly generated to train a data model.

3. The computer-implemented method of claim 2, wherein trained data model is employed to align the template image and an image of a product under inspection to determine whether the product has a defect.

4. The computer-implemented method of claim 1, wherein types of the respective geometric training parameters are selected from a group consisting of a rotation angle parameter, a shearing parameter and a scale parameter.

5. The computer-implemented method of claim 1, further comprising:
    evaluating, by the device, an image of the product under inspection; and
    aligning, by the device, the image of the product under inspection with the template image, wherein the aligning is performed based on the trained data model generated from the respective transformed template images.

6. The computer-implemented method of claim 5, further comprising:
    comparing, by the device, the aligned image and the template image to identify the defect of the product under inspection.

7. The computer-implemented method of claim 1, wherein a data model is built based on a neural network selected from a group consisting of a Convolution Neural Network, a Recurrent Neural Network and a Deep Neural Network.

8. The computer-implemented method of claim 7, wherein the neural network on which the data model is based contains multiple convolution layers and multiple max pooling layers.

9. The computer-implemented method of claim 1, wherein a data model is trained by machine learning of a correspondence between a transformed image and the template image through the respective geometric training parameters.

10. A system, comprising:
a memory that stores computer executable components;
a processor that executes the computer executable components stored in the memory, wherein the computer executable components comprise:
at least one computer-executable component that:
iteratively employs a random number generator to randomly generate respective random transformation parameters to be employed by a geometric transformation module to geometrically transform a template image of a defined product; and
iteratively generates respective geometric training parameters for transforming the template image, wherein the respective geometric training parameters are based on the respective random transformation parameters.

11. The system of claim 10, wherein the at least one computer-executable component comprises:
at least one computer-executable component that:
iteratively transforms the template image using the respective geometric training parameters to generate respective transformed template images that are randomly generated to train a data model.

12. The system of claim 11, wherein a trained data model is employed to align the template image and an image of the product under inspection to determine whether the product has a defect.

13. The system of claim 10, wherein types of the respective geometric training parameters are selected from a group consisting of a rotation angle parameter, a shearing parameter and a scale parameter.

14. The system of claim 10, wherein the at least one computer-executable component comprises:
at least one computer-executable component that:
evaluates an image of the product under inspection; and
aligns the image of the product under inspection with the template image, wherein the aligning is performed based on the trained data model generated from the respective transformed template images.

15. The system of claim 14, wherein the at least one computer-executable components comprise:
at least one computer-executable component that:
compares the aligned image and the template image to identify the defect of the product under inspection.

16. The system of claim 10, wherein a data model is built based on a neural network selected from a group consisting of a Convolution Neural Network, a Recurrent Neural Network and a Deep Neural Network.

17. A computer program product facilitating detection of product defects by aligning product images under inspection with template product images, the computer program product comprising a computer readable storage medium having program instructions embodied therewith, the program instructions executable by one or more processors to cause the one or more processors to:
iteratively employ, by the one or more processors, a random number generator to randomly generate respective random transformation parameters to be employed by a geometric transformation module to geometrically transform a template image of a defined product; and
iteratively generate, by the one or more processors, respective geometric training parameters for transforming the template image, wherein the respective geometric training parameters are based on the respective random transformation parameters.

18. The computer program product of claim 17, wherein the program instructions executable by the one or more processors to cause the one or more processors to:
iteratively transforms the template image using the respective geometric training parameters to generate respective transformed template images that are randomly generated to train a data model.

19. The computer program product of claim 17, wherein types of the respective geometric parameters are selected from a group consisting of a rotation angle parameter, a shearing parameter and a scale parameter.

20. The computer program product of claim 17, wherein the program instructions are further executable by the one or more processors to cause the one or more processors to:
receive an image of a product under inspection;
align the image of the product under inspection with the template image; and
compare the aligned image and the template image to identify the defect of the product.

* * * * *